United States Patent
Verheyden

(10) Patent No.: US 8,621,392 B2
(45) Date of Patent: Dec. 31, 2013

(54) METHOD OF NAVIGATING ITEMS AT A MEDIA PLAYER

(75) Inventor: Karl Frans Mario Verheyden, Leuven (BE)

(73) Assignee: Koninklijke Philips N.V., Eindhoven (NL)

( * ) Notice: Subject to any disclaimer, the term of this patent is extended or adjusted under 35 U.S.C. 154(b) by 1034 days.

(21) Appl. No.: 12/305,206

(22) PCT Filed: Jun. 21, 2007

(86) PCT No.: PCT/IB2007/052407
§ 371 (c)(1),
(2), (4) Date: Dec. 17, 2008

(87) PCT Pub. No.: WO2008/007269
PCT Pub. Date: Jan. 17, 2008

(65) Prior Publication Data
US 2009/0178001 A1    Jul. 9, 2009

(30) Foreign Application Priority Data
Jun. 23, 2006    (EP) .................................. 06115975

(51) Int. Cl.
*G06F 3/048* (2013.01)
*G06F 17/30* (2006.01)

(52) U.S. Cl.
USPC ........................... 715/825; 715/716; 715/811

(58) Field of Classification Search
USPC ........................ 715/716, 810, 811
See application file for complete search history.

(56) References Cited

U.S. PATENT DOCUMENTS

| 6,438,579 | B1 * | 8/2002 | Hosken ..................... 709/203 |
| 7,000,188 | B1 | 2/2006 | Eustace |
| 2004/0123725 | A1 | 7/2004 | Kim |
| 2005/0021470 | A1 | 1/2005 | Martin et al. |

(Continued)

FOREIGN PATENT DOCUMENTS

| EP | 1489765 A2 | 12/2004 |
| EP | 1548741 A1 | 6/2005 |

(Continued)

OTHER PUBLICATIONS

Pampalk E et al: "Dynamic Playlist generation based on skipping behaviour" Proceedings Annual International Symposium on Music Information Retrieval, XX, XX, Sep. 15, 2005, pp. 1-4, XP002424957.

(Continued)

*Primary Examiner* — Daeho Song

(57) ABSTRACT

A media player stores, or has access to, a set of media items. The player presents a first of the media items. The set of media items are ordered according to at least one criterion indicative of similarity of the media items to the first media item. The player determines what amount of the first media item was presented before an input is received from a user control. A second media item is selected for presenting using the determined amount as a measure for selecting the second media item from the ordered set of media items. A single user input (e.g. from a single button) can be used both to control the selection of the next item, and to determine the similarity of the next item. The ordering can be based on similarity of features or similarity of metadata.

20 Claims, 5 Drawing Sheets

(56) References Cited

U.S. PATENT DOCUMENTS

| | | |
|---|---|---|
| 2005/0262528 A1 | 11/2005 | Herley et al. |
| 2005/0273515 A1* | 12/2005 | Bodlaender .................. 709/232 |
| 2006/0212478 A1* | 9/2006 | Plastina et al. ............. 707/104.1 |
| 2006/0218187 A1* | 9/2006 | Plastina et al. ............. 707/104.1 |
| 2007/0016599 A1* | 1/2007 | Plastina et al. ................ 707/101 |
| 2007/0089057 A1* | 4/2007 | Kindig .......................... 715/716 |
| 2007/0220045 A1* | 9/2007 | Morris et al. ............. 707/104.1 |

FOREIGN PATENT DOCUMENTS

| | | |
|---|---|---|
| WO | 2005050620 A1 | 6/2005 |
| WO | 2005071569 A1 | 8/2005 |
| WO | 2006054235 A2 | 5/2006 |

OTHER PUBLICATIONS

Andreja Andric et al: "Automatic playlist generation based on tracking user's listening habits" Multimedia Tools and Applications, Kluwer Academic Publishers, BO, vol. 29, No. 2, May 19, 2006, pp. 127-151, XP019404136 ISSN: 1573-7721.

* cited by examiner

METHOD OF NAVIGATING ITEMS AT A MEDIA PLAYER

This invention relates to a method of navigating a set of media items at a media player and to control logic and a media player for performing the method.

Media players can store and play media content such as audio tracks (e.g. songs) and image or video files (e.g. digital still images, video clips, movies). A typical media player has a rewriteable storage medium such as a solid state memory or hard drive on which a user can store media content. More efficient media coding schemes and the decreasing cost of high capacity storage media have allowed devices of this kind to store a significant quantity of content. It is now possible to store vast amounts of content, such as a user's entire audio collection, on a single storage device.

In some environments where media players are used, such as while driving a vehicle or while exercising, a user is unable to navigate a complicated user interface to select a desired content item. Media players are known to provide a simple feature which randomly selects an item, but this will often select an item which is unsatisfactory to the user. A user can repeatedly skip forwards to the next randomly selected item until they find an item that they wish to listen to, but this can be impractical where the player holds a large number of content items.

It is known to provide a media player which learns a user's preferences. U.S. Pat. No. 7,000,188 describes a media player which maintains a 'selection probability' for each media item stored on the player and attempts to update this selection probability by learning what a user likes. A system of this kind requires a period of time to learn what a user likes. It also has a level of hysteresis and so cannot adapt quickly to a new preference of a user, or a new user.

The present invention seeks to provide an improved way of navigating a set of media items at a media player.

Accordingly, a first aspect of the present invention provides a method of navigating a set of media items comprising:

selecting a first item from the set of media items;
ordering the set of media items according to at least one criterion indicative of similarity of the media items to the first media item;
presenting the first media item and waiting for a user input during presentation of the first media item;
upon receiving the user input, determining what amount of the first media item was presented before the input was received and selecting a second media item for presenting using the determined amount as a measure for selecting the second media item from the ordered set of media items.

The amount of the first item that was presented, before a user decided to select a new media item, is used to control how similar the second media item should be to the first media item. As items have been ordered in a list according to similarity, the amount is used to select the position of the next item within the ordered list. In this manner, a single user input (e.g. input via a single button, or using voice/gesture) can be used both to control the selection of the next item, and to determine the similarity of the next item. This has the advantage of requiring minimal input from a user, and is therefore well-suited to environments where a user should not be distracted. The invention can be applied to portable or fixed players and is especially useful in players which are mounted in, or used within, vehicles. In the event that user input is not received during presentation of the first item (i.e. the first item is presented until the end) the next most similar item in the ordered set of media items can be presented to the user, as it is assumed the user liked the first item.

The method can be performed iteratively, with each subsequent iteration of the method using the same set of media items or only a portion of the ordered set of media items (such as a portion of the ordered set beginning with the second media item). After each iteration of the method, presented items can be removed from the set of items available for selection during further iterations of the method.

During the first iteration of the method, the selection of the first media item can be achieved by: making a random selection, receiving a selection from a user or retrieving an identifier of the last presented item.

The step of determining what amount of the first media item was presented can be determined from an elapsed time, or from an amount of data (e.g. number of bytes) consumed during presentation. The amount can be an absolute amount of the item (e.g. elapsed time or number of bytes) or can be expressed as a ratio of the elapsed presentation time (or amount of data used during presentation) to the total length of the item.

The step of ordering the set of media items can be achieved using various techniques. The ordering is preferably achieved using one or more characteristics of the media items themselves, which has the advantage of not requiring the media player to learn a user's preferences. Metadata which accompanies each media item can be used. Additionally, or alternatively, fingerprint techniques can be used. Each media item has a 'fingerprint' which is based on features of the media item, such as spectral content, beat etc. Different genres of item have different types of fingerprint. By calculating distances between fingerprints of media items and ordering according to increasing distance, it is possible to order according to similarity. The ordering step does not need to be performed in the order recited in claim 1: ordering can be performed as an initial step, before presentation of the first item, during presentation of the first item, or after receiving the input from a user. Ordering can be performed after each selection of a new item, with the new ordering being based on similarity of the set of items to the new item, or the ordering can be performed less frequently to conserve processing resources.

Preferably, the step of using the determined duration comprises mapping the determined duration to one of the media items in the ordered set of media items. The mapping can be a linear mapping or a non-linear mapping which has an advantage of taking into account the typical behaviour of a user.

Preferably, the step of selecting a second media item uses a ratio of the duration for which the first media item was presented to the total duration of the first item.

The set of items can be all of the items stored on a storage medium, or a sub-set of those items, such as a playlist created by a user. The items can be stored on a storage device which is local to the player or which is external to the player and accessed via a communications interface.

The method is especially useful with media items in the form of audio tracks, such as songs, but can also be applied to other forms of media item, such as video.

Further aspects of the present invention provide control logic for implementing the method and a media player which incorporates the control logic. The media player can comprise a store which holds the media items, or it can access a remote store which holds the media items.

The functionality described here can be implemented in software, hardware or a combination of these. The invention can be implemented by means of hardware comprising several distinct elements, and by means of a suitably programmed processor. Accordingly, another aspect of the invention provides a computer program product (software) carrying instructions which, when executed by a computer or processor, implement the method. The software may be stored on an electronic memory device, hard disk, optical disk or other machine-readable storage medium. The software may be downloaded directly to the media player via a network connection.

The media player can be implemented as a fixed or portable player, such as vehicle-mounted unit, personal media player, home media centre, set-top box, Personal Video Recorder (PVR), mobile phone or as software performed by a general purpose personal computer (PC).

Embodiments of the present invention will now be described, by way of example only, with reference to the accompanying drawings, in which:—

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim.

Figure 1:
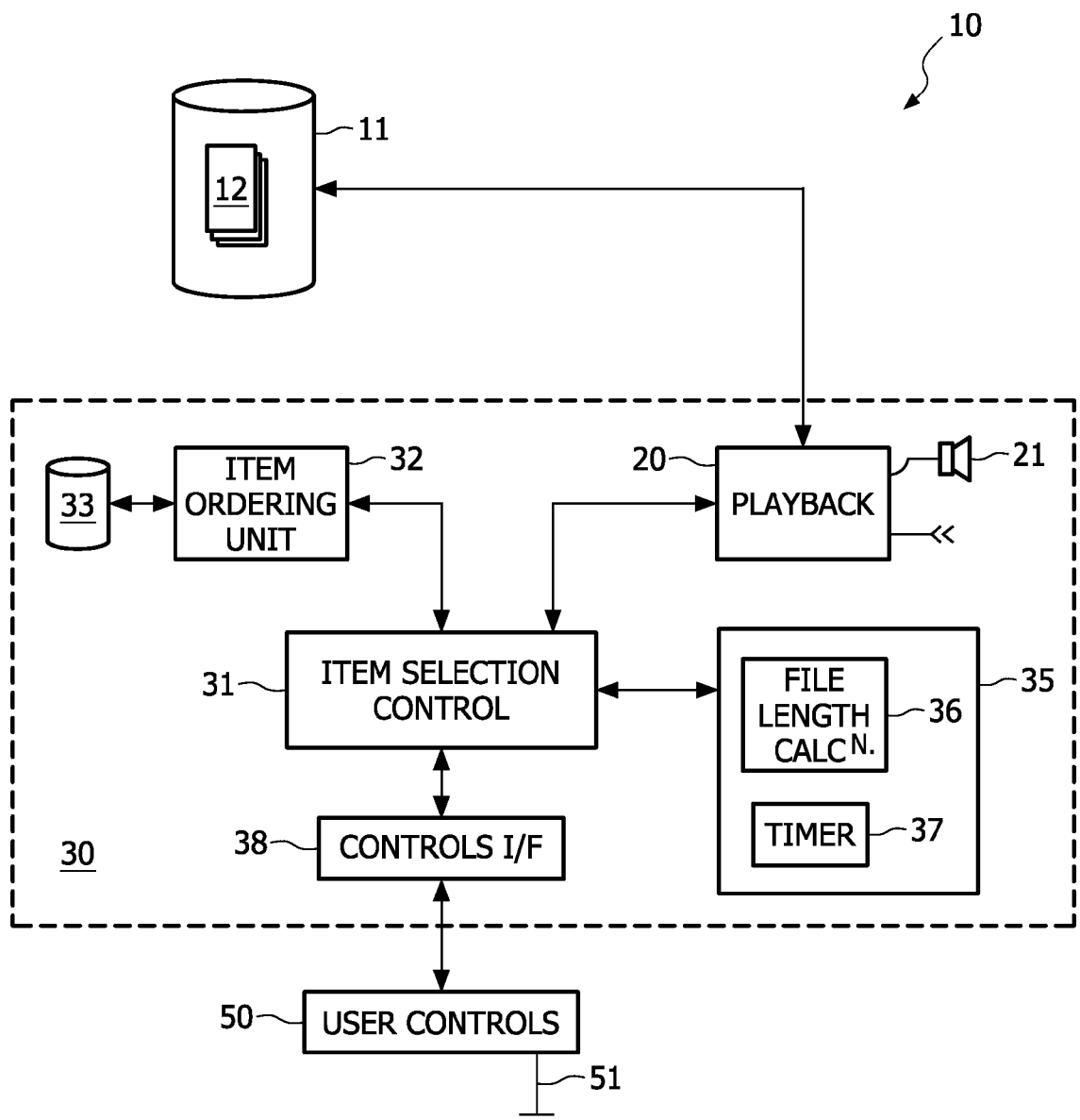
FIG. 1 shows the functional elements of a media player for implementing the present invention.

FIG. 1 shows a media player 10 according to an embodiment of the invention. The player 10 includes, or has access to, a storage medium 11 which stores digital data representing media content items 12 in a conventional manner. The storage medium 11 can form part of the same physical device as the player 10, such as an internal hard-disk drive or internal flash memory or can be a removable device, such as a removable memory card (e.g. a Universal Serial Bus (USB) memory stick) or an optical disc (e.g. Compact Disc (CD), Digital Versatile Disc (DVD) or Blu-Ray™ disc). Where the storage medium 11 is an optical disc, the player includes a transport mechanism with a drive and a read head to retrieve data from the optical disc, the detail of which will be well known to a skilled person. In a further alternative, the storage medium 11 can be located remotely from the player and the player communicates with the storage medium 11 via a wired or wireless communication link. As an example, a portable media player 10 can be wirelessly connected to a remote media server.

A playback unit 20 receives data from the storage medium 11. The playback unit 20 includes demultiplexing and decoding functions appropriate to the types of data stored on medium 11, e.g. MP3 and MPEG4 decoders. In a conventional manner, data is retrieved from the storage medium 11 into a buffer and delivered from the buffer to an output stage for presentation to a user. An output stage of the playback unit 20 includes a digital-to-analogue converter (DAC) which feeds loudspeakers, a headphone socket or audio line out. For video, the output stage can include a display or a video line out. All of this is conventional and the detail will be known to a skilled person.

The player 10 has a set of user controls 50 which allow a user to provide control inputs to the player 10. The user controls 50 can take the form of an operating panel mounted on the media player 10 or a wired or wireless remote control. Where the player 10 is used in a vehicle, controls 50 can be positioned on, or adjacent, controls for the vehicle, such as buttons on control stalks adjacent the steering wheel or a control panel mounted in a dashboard of the vehicle. The user controls can have a graphical user interface (GUI) or the user controls can use a video overlay to display user selectable options on a display connected to the player 10. User controls interface 38 determines what controls have been operated by a user and applies input signals to other units within controller 30. Where the user controls include graphical menus, interface 38 provides outputs to display those menus. It is preferable that the user controls 50 include a single control 51 which allows a user to easily provide an input to the player. This control can be a button, but can also take the form of any manually-actuable input or even a voice or gesture input device. In simple players, such as a player without a display, there may only be the single user control 51 and the feature is always activated. Alternatively, the feature can be activated by selection from a menu, or by a dedicated control on the user controls 50.

A controller 30 controls operation of the player 10. Controller 30 includes the following blocks or functional units which are particularly relevant to the present invention: a next item selection unit 31, an item ordering unit 32, a feature vector metadata database 33, a timer 37, an audio file duration calculation function 36 and a user controls interface 38. The functional units are preferably implemented as code modules which form a control application executed by a general-purpose processor. However, it will be readily appreciated that the controller 30 can alternatively be implemented using an Application Specific Integrated Circuit (ASIC), a programmable array or any other suitable logic circuit. The processor or logic circuit includes a working memory. Each of the functional units of the controller 30 will now be described in more detail.

An item selection unit 31 controls the selection of a new media content item for playback. Unit 31 receives inputs from user controls 50 (via user controls interface 38) whenever a user activates one of the controls 50. Particularly relevant to this invention, item selection unit 31 is notified when a button 51 is pressed. The next item selection unit 31 provides a seed item to the item ordering unit 32. Item ordering unit 32 arranges the set of stored items based on likeness to the seed item, from most similar to least similar. As described above, the similarity ordering can be based on analysis of metadata or analysis of the content data (e.g. spectral content, beat etc.) A suitable technology is LikeMusic™ of Koninklijke Philips Electronics N.V. Determining similarity of content items is described, for example, in WO 2005/050620, WO 2005/071569 and WO 2006/054235 and does not need to be described in any further detail.

Item ordering unit 32 has access to a feature vector metadata database 33. The feature vector metadata database 33 contains a record for each content item 12 in the storage medium 11. Each database record contains a unique identification of the item 12 (e.g. the fully qualified file name) and an associated feature vector for that item 12. This database 33 can be stored on the same storage medium 11 as the content items or on another storage device, such as a memory local to the controller 30, as shown in FIG. 1. The item ordering unit 32 retrieves the feature vector for the seed item from the feature vector metadata database 33. It calculates the distance from the seed item feature vector to the feature vector of each other individual item by a matrix calculation. The items are then ordered based on the calculated distance, from smallest distance (most similar items) to largest distance (least similar items). The complete calculated playlist is provided to the item selection unit 31. The feature vector need only be extracted once, as it does not change unless there is a change to the item itself. The extraction of the feature vector can be performed by player 10 or by an external server.

The next item selection unit 31 also uses a timing calculation unit 35. Two main times are calculated and used by the method: (i) the total duration of an item and (ii) the duration that an item is played before a user selects a new item. Item duration calculation unit 36 can calculate the total duration of an item. There are various ways of calculating the total duration. Unit 36 accesses storage medium 11 to obtain information about the requested item. Some media content items include total duration as part of metadata for the item. This metadata may be stored with the item or the item may include a field indicating the location of the metadata which carries the total duration field. Clearly, if the item's metadata includes this information, this is the easiest way to obtain the total duration. Another way of calculating the total duration is to retrieve the total file size of the item (e.g. in bytes) and to divide this by the average bitrate for the item. As some files (e.g. MP3 compressed audio) store metadata within the file the number of bytes used to store the embedded metadata should be deducted from the total file size to ensure an accurate result. The average bitrate can be retrieved from the file in a number of ways: directly from metadata (for file formats which include this information); by using the average of the bitrates for individual audio frames; based on knowledge of the audio file storage (e.g. Compact Disc Digital Audio (CD-DA) is always 1411200 bits/s).

A timer 37 can calculate the elapsed time between the time at which playback of a content item begins and the time at which button 51 is pressed by the user. Note that as an alternative to using time-based measurements it is possible to derive similar information using number-of-bytes-based measurements. This would derive the number of bytes consumed by the playback unit 20 compared to the total number of bytes for the item.

It will be understood that, in use, content items are presented to a user by playback unit 20 in parallel to the operation of other functional units 31, 32, 35.

Figure 2:
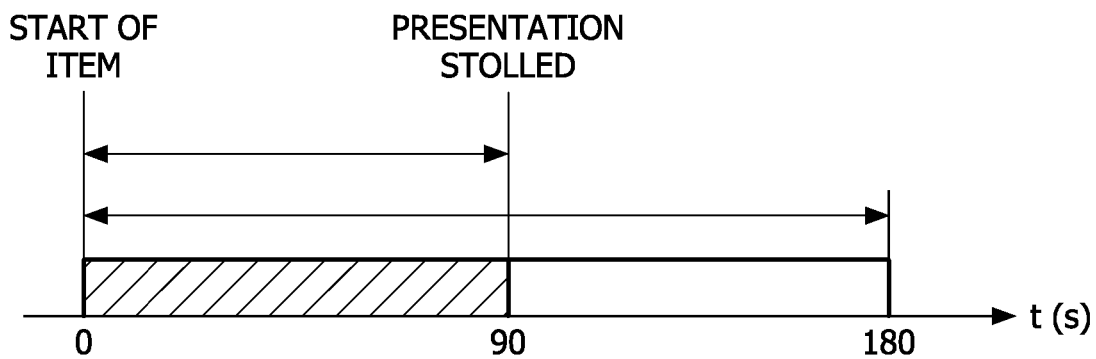
FIG. 2 shows a timeline of playback of a media item.
Figure 3:
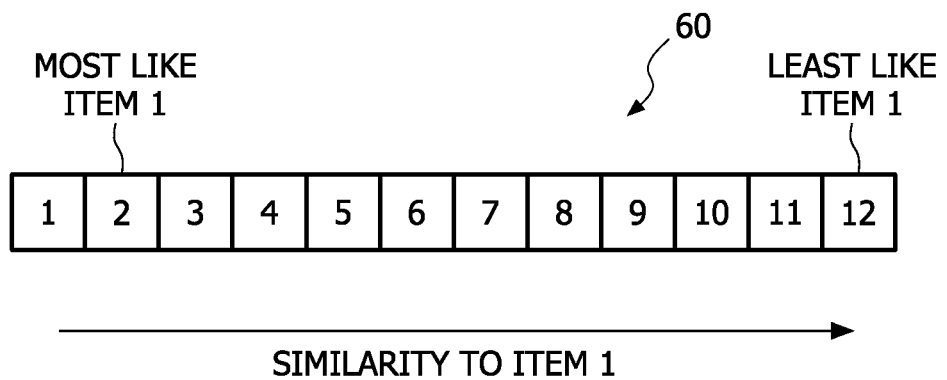
FIG. 3 shows an ordered list of media items.

A simple overview of the method will now be described with reference to FIGS. 2 and 3. For ease of explanation, in this example it is assumed that the player will make use of a set of 12 items (set 60, labelled Item 1-Item 12 in FIG. 3). This set of items 60 can be all of the items stored on storage medium 11 or a sub-set of the items (e.g. items stored in a list prepared in advance by the user or a third party). FIG. 2 shows a time line of a first item (e.g. a song) 'Item 1'. Item 1 has a total duration of 3 minutes (180 seconds). At time t=0 playback of the item begins. At time t=90 s a user presses control 51 to select a new item. Controller 30 counts the time between the start of presentation of Item 1 and the time at which the user pressed control 51 and records an elapsed presentation time of 90 seconds. The set of items 60 have been ordered according to likeness to Item 1. FIG. 3 shows the ordered list of items, with item 2 being the next most similar to Item 1 and Item 12 being the least similar. The duration that the user listened to Item 1 (the elapsed presentation time) is used to select a new item from the ordered list. The reasoning is that if a user spent a long time listening to Item 1, the next item should be similar to Item 1 whereas if a user spent a short time listening to Item 1, the next item should be very different to Item 1. In this example the elapsed duration was 90 seconds. An item from the middle of the ordered list is selected. One example mapping of the elapsed presentation time to the selection of the next item is given in equation (1):

$$\left[1 - \frac{elaspsed\_presentation\_time}{total\_item\_duration}\right] * total\_number\_of\_items \quad (1)$$

Figure 4:
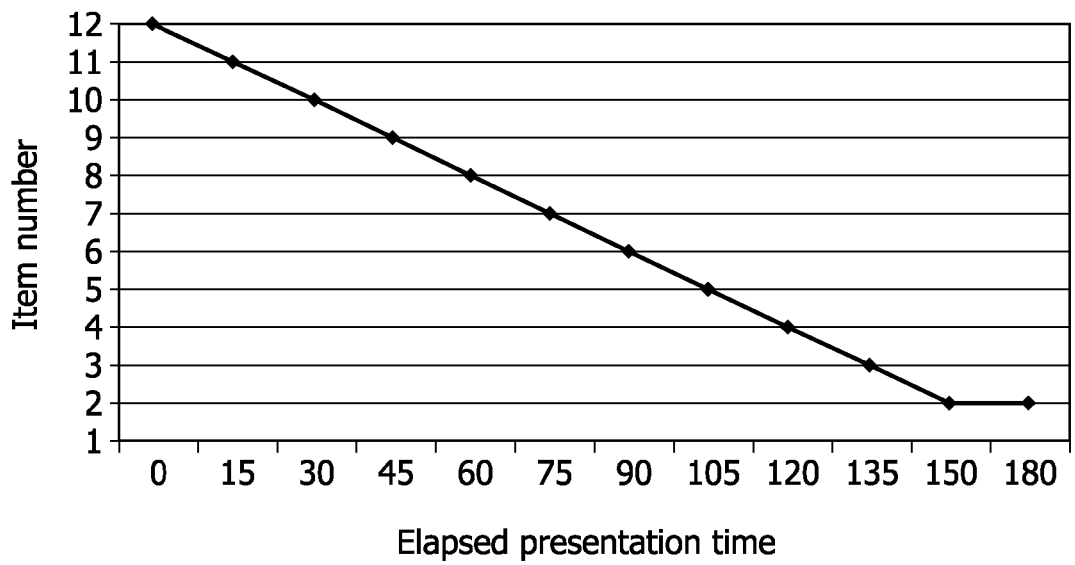
FIG. 4 shows a first example of a mapping between presentation time and item selection.
Figure 5:
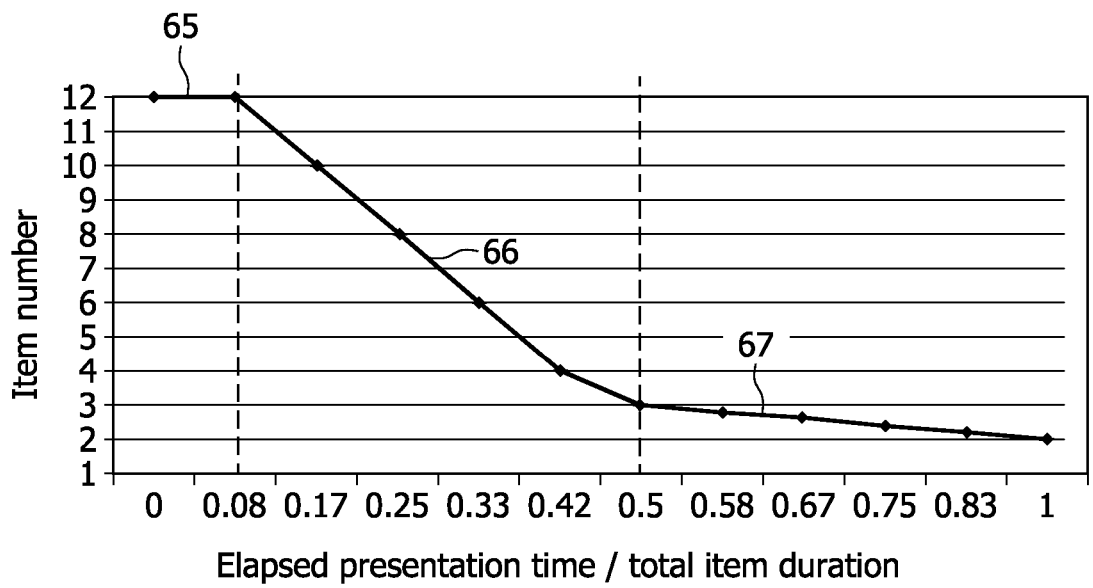
FIG. 5 shows a second example of a mapping between presentation time and item selection.

Using equation (1) the mapping from elapsed presentation time to item selection is a linear relationship, as shown graphically in FIG. 4. The selection of the next item is linearly related to the portion of Item 1 that is presented to the user. In FIG. 4, the horizontal axis is expressed as elapsed presentation time. In this example the mapping between elapsed presentation time and next item is tailored to the total length (180 seconds) of the current item. More generally, the horizontal axis can be expressed as the ratio of (elapsed presentation time/total item duration) to give the fraction of the item that was presented. This ratio has the range 0-1. As an alternative to basing the mapping on a ratio, the horizontal axis can comprise the same fixed set of elapsed times (or numbers of consumed bytes) regardless of the total length of the item. This alternative can provide the user with more certainty as to how their input will affect the choice of next item. The mapping need not be linear, and FIG. 5 shows an example of a non-linear mapping. This mapping takes into account the fact that a user needs some time to identify the current item and also takes into account that a real dislike will be signalled by a user early in the item. The first 10% of the elapsed presentation time (portion 65) is not taken into account to determine the number of items to skip. The next portion 66 of the elapsed presentation time has a steep linear (or non-linear) relationship. This applies more weight to a decision to move to the next item during the first 50% of presentation of the first item. In this example, 40% of the elapsed presentation time maps to 75% (i.e. 9 out of 12) of the items in set 60. The remaining 50% of the elapsed presentation time (portion 67) covers the remaining 25% of the items in set 60. In FIG. 5, the horizontal axis is labelled as the ratio (elapsed presentation time/total item duration). It will be appreciated that other mappings can be used, as desired.

Whatever mapping is used, if an item is presented through to the end, then the next item that is presented to the user is the next most similar item in the list 60. In this example, the next most similar item is Item 2.

Figure 6:
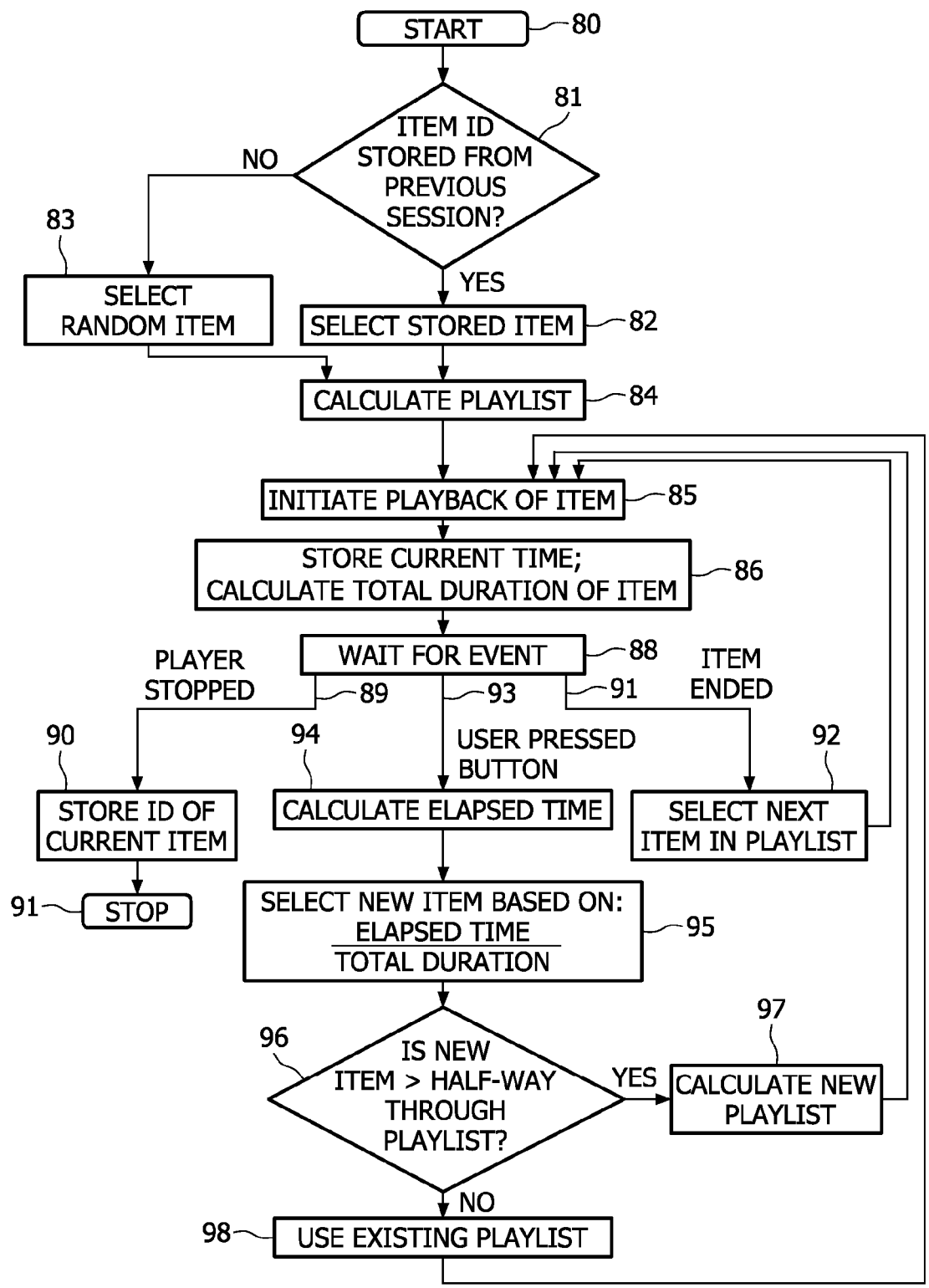
FIG. 6 shows a flow chart of a method for navigating items according to an embodiment of the invention; and, FIG. 7 shows generation of playlist for use in the method of FIG. 6.

FIG. 6 shows a more detailed flow chart of one example embodiment of the method. At step 80 the player is started with the feature activated. Steps 81-83 determine a starting item. This depends on whether the player stored the identity of an item that was playing, during a previous session, before the player was switched off (step 81). If the player has stored the identity of an item, that item is selected at step 82. If the identity of a previously played item is not known, an item is randomly selected (step 83). A further possibility (not shown) is that a user may select the starting item. In each of the above cases, at step 84 an ordered list of the items is created (using unit 32), with the item selected at steps 82 or 83 as the seed item. Thus, the list of FIG. 3 will be based according to likeness to the seed item. At step 85, playback of the selected item is initiated, using playback unit 20. At step 86 current time is stored to enable subsequent calculation of the presentation time of the item (i.e. the time a user listens to/watches the item before making an input). [As an alternative (not shown in FIG. 6), the amount a user listens to/watches the item can be computed by counting the number of bytes of the item that have been presented.] The total duration of the item is also determined, such as by using one of the above described methods.

At step 88 the controller waits for an event. The possible events include: the player being stopped (output branch 89); the user pressing control 51 (output branch 93); and playback of the item ending due to reaching the end of the item (output branch 91). If the player is stopped (output branch 89) the controller stores the identity of the current item at step 90 and then stops the player (step 91). If playback of the item reached the natural end of the item (output branch 91), this indicates the user liked the item. Therefore, at step 92, the next most similar item is selected in the ordered list (generated at step 84) and playback of that item begins at step 85. If the user pressed control 51 (output branch 93) this indicates a user wishes to select a different item. At step 94 a calculation is made of the elapsed presentation time of the current item. At step 95, the presentation time and total duration are used to select a new item. This can be based on equation (1) or any other desired mapping. Having selected the next item at step 95, the list of items (the playlist) needs to be rearranged. Steps 96-98 show one way in which the list of items can be rearranged. At step 96 a check is made whether the item that was selected at step 95 is more than halfway along the list. If so, at step 97 a new playlist is calculated using unit 32, based on the new item (selected at step 95) as a seed item and the method returns to step 85. If the selected item is less than halfway along the list, the current playlist can be used (step 98) and the method returns to step 85. The method continues until the player is stopped (steps 89-91).

The reasoning behind steps 96-98 is that, as long as the new seed song is still sufficiently similar to the original (i.e. first) seed song, the likeness ordering of the first seed song is representative for the new seed song because they are similar. No new playlist need be calculated. This avoids the problem of recently presented items from being reselected within a short period and minimises processing performed by ordering unit 32. The old playlist is still used for the new current song, but the start is shifted to right behind the new current song (so the playlist is shorter). However, when the new current song is too dissimilar to the first seed song, the playlist is recalculated with the new current song as seed song, because the playlist is not optimal anymore and because it has become potentially too short. Under normal circumstances, with a large set of songs forming the playlist, the halfway point in the list will only be exceeded if a user signals a dissatisfaction with the current song. Note that use of the halfway point of the playlist as criterion is only a guideline and this figure can be varied as required.

Figure 7:
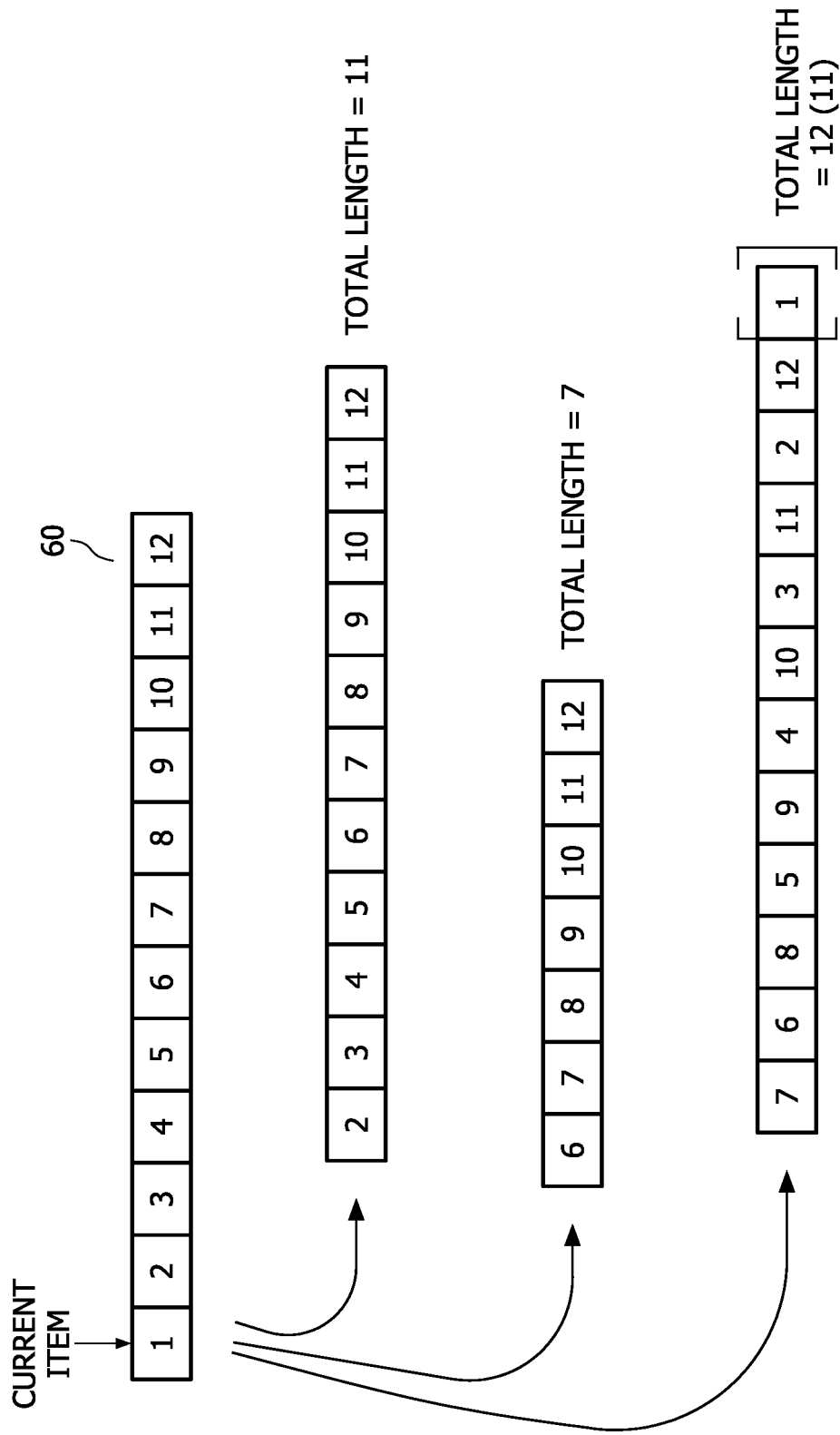

FIG. 7 shows the way in which the simple playlist of FIG. 3 can alter over a period of time, using the method of FIG. 6. The original playlist 60 is shown at the top of FIG. 7. Presentation of Item 1 begins. The options during (or at the end of) Item 1 are:

(i) Item 1 is played for the full duration. Item 2 is selected as the next item. The playlist is not recalculated, but simply shifts along by one item. Item 1 is removed from the list. The playlist now contains 11 items.

(ii) Item 1 is interrupted halfway through the item (as shown in FIG. 2). Item 6 is selected as next item, as this is halfway along the playlist. The playlist is not recalculated but simply shifts along by 5 items. Item 1-5 are removed from the list as they are too similar to item 1. The playlist now contains 7 items.

(iii) Item 1 is interrupted shortly before halfway through, so item 7 is selected as the next item. The playlist is recalculated, based on similarity to item 7. The new playlist contains 12 items. As a refinement, a history list can be maintained of recently played items, and these items are removed from the playlist. With this refinement, the recalculated playlist contains only 11 items, and there is no option that item 1 can be reselected.

In the examples of playlist shifting/reordering shown in FIG. 7, the same set of reference labels "1, 2, 3, . . . 12" has been used for the items after shifting/reordering, as were used before shifting/reordering to illustrate how the position of items within the list has changed. It will be appreciated that after the shifting/reordering has occurred the reference labels can be changed to reflect the new order of the items (e.g. in the first option the set of items "2, 3, . . . 12" can be relabelled as "1, 2, . . . 11"; in the second option the set of items "6, 7, . . . 12" can be relabelled as "1, 2, . . . 7".) This allows the mapping function (Eqn. 1) to directly map to an item number within the ordered list.

The method presented above minimises the amount of processing performed by ordering unit 32. An alternative method reorders the playlist each time a new item starts. A history of recently played items is maintained, and this list is used to filter out recently played items when generating an ordered list of items. This prevents recently played items from reappearing in the playlist, which can be annoying to a user.

In the description above, and with reference to the Figures, there is described a media player 10 which stores, or has access to, a set of media items 12. The player presents 20 a first of the media items. The set of media items 12 are ordered 32 according to at least one criterion indicative of similarity of the media items to the first media item. The player determines 37 what amount of the first media item was presented before an input is received from a user control 51. A second media item is selected for presenting using the determined amount as a measure for selecting the second media item from the ordered set of media items. A single user input (e.g. from a single button 51) can be used both to control the selection of the next item, and to determine the similarity of the next item. The ordering 32 can be based on similarity of features or similarity of metadata.

The invention claimed is:

1. A method of navigating a set of media items comprising:
   selecting a first item from the set of media items;
   forming a first list of the media item by ordering the set of media items according to at least one criterion indicative of similarity of the media items to the first media item so that a next item from a current item is more similar to the current item than further next items of the first list;
   presenting the first media item and waiting for a user input during presentation of the first media item;
   upon receiving the user input, determining what amount of the first media item was presented before the input was received;
   forming a second list of the media item from the first list using the determined amount of the first media item presented before the input was received; and
   selecting from the second list a second media item for the presenting, wherein the act of forming the second list skips items from the first list closest to the current item, and wherein a number of the skipped items is proportional to the amount of the first media item presented before the input was received so that more media items of the first list are skipped when the determined amount of the first media item is large and less media items of the first list are skipped when the determined amount of the first media item is small.

2. The method according to claim 1, wherein the act of selecting the second media item comprises using the determined amount to map to one of the media items in the ordered set of media items.

3. The method according to claim 2, wherein the mapping is non-linear.

4. The method according to claim 1, wherein the determining act determines a ratio of time for which the first media item was presented, or a quantity of data used during presentation of the first media item, to a total length of the first media item.

5. The method according to claim 1, wherein the act of forming the first list comprises ordering the set of media items according to one of: similarity of features, similarity of metadata associated with the media items.

6. The method according to claim 1, further comprising the act of maintaining a list of presented media items and removing said presented media items from the ordered set of media items.

7. The method according to claim 1 wherein the act of forming the second list is performed after each selection of a media item.

8. The method according to claim 1 wherein, no input is received from a user during presentation of the first media item, the media item which is most similar to the first media item, in the first list is selected as the second media item.

9. The method according to claim 1 wherein the set of media items is selected from a larger set of items stored on a storage medium.

10. The method of claim 1, wherein the act of forming the second list at least one of shifts and removes media items from the first list when the determined amount of the first media item was presented before the input was received is more than a predetermined value.

11. The method of claim 10, wherein the act of forming the second list reorders the media items based on similarity to the second media item when the determined amount is less than the predetermined value.

12. The method of claim 1, wherein the act of forming the second list reorders the media items based on similarity to the second media item when the determined amount is less than a predetermined value.

13. A device for navigating a set of media items comprising:
a memory for storing media items or an interface for accessing a store of media items;
a user interface for receiving user input; and
a processor configured to cause performance of the acts of:
selecting a first item from the set of media items;
forming a first list of the media item by ordering the set of media items according to at least one criterion indicative of similarity of the media items to the first media item so that a next item from a current item is more similar to the current item than further next items of the first list;
presenting the first media item and waiting for a user input during presentation of the first media item;
upon receiving the user input, determining what amount of the first media item was presented before the input was received;
forming a second list of the media item from the first list using the determined amount of the first media item presented before the input was received; and
selecting from the second list a second media item for the presenting, wherein the act of forming the second list skips items from the first list closest to the current item, and
wherein a number of the skipped items is proportional to the amount of the first media item presented before the input was received so that more media items of the first list are skipped when the determined amount of the first media item is large and less media items of the first list are skipped when the determined amount of the first media item is small.

14. The device of claim 13, wherein the act of forming the second list at least one of shifts and removes media items from the first list when the determined amount of the first media item was presented before the input was received is more than a predetermined value.

15. The device of claim 14, wherein the act of forming the second list reorders the media items based on similarity to the second media item when the determined amount is less than the predetermined value.

16. The device of claim 13, wherein the act of forming the second list reorders the media items based on similarity to the second media item when the determined amount is less than a predetermined value.

17. A non-transitory computer readable medium embodying computer instructions for navigating a set of media items, wherein the computer instructions, when executed by a processor, configure the processor to cause performance of the acts of:
selecting a first item from the set of media items;
forming a first list of the media item by ordering the set of media items according to
at least one criterion indicative of similarity of the media items to the first media item so that a next item from a current item is more similar to the current item than further next items of the first list;
presenting the first media item and waiting for a user input during presentation of the first media item;
upon receiving the user input, determining what amount of the first media item was presented before the input was received;
forming a second list of the media item from the first list using the determined amount of the first media item presented before the input was received; and
selecting from the second list a second media item for the presenting, wherein the act of forming the second list skips items from the first list closest to the current item, and
wherein a number of the skipped items is proportional to the amount of the first media item presented before the input was received so that more media items of the first list are skipped when the determined amount of the first media item is large and less media items of the first list are skipped when the determined amount of the first media item is small.

18. The non-transitory computer readable medium of claim 17, wherein the act of forming the second list at least one of shifts and removes media items from the first list when the determined amount of the first media item was presented before the input was received is more than a predetermined value.

19. The non-transitory computer readable medium of claim 18, wherein the act of forming the second list reorders the media items based on similarity to the second media item when the determined amount is less than the predetermined value.

20. The non-transitory computer readable medium of claim 17, wherein the act of forming the second list reorders the media items based on similarity to the second media item when the determined amount is less than a predetermined value.

* * * * *